(12) United States Patent
Prösl

(10) Patent No.: US 6,309,152 B1
(45) Date of Patent: Oct. 30, 2001

(54) TOOL UNIT WITH CUTTER HEAD

(76) Inventor: Johanna Prösl, Freihunger Strasse 10, D-92708 Mantel (DE)

( * ) Notice: Subject to any disclaimer, the term of this patent is extended or adjusted under 35 U.S.C. 154(b) by 0 days.

(21) Appl. No.: 09/512,365

(22) Filed: Feb. 25, 2000

(30) Foreign Application Priority Data

Feb. 25, 1999 (DE) .............................. 299 03 312

(51) Int. Cl.⁷ .................................................. B23C 9/00
(52) U.S. Cl. ........................................... 409/138; 409/140
(58) Field of Search .......................... 29/33.1; 409/138, 409/140, 232, 234, 230; 901/41, 45; 451/259, 236

(56) References Cited

U.S. PATENT DOCUMENTS

| 4,518,307 | * | 5/1985 | Bloch ............................ 409/138 UX |
| 4,979,854 | * | 12/1990 | Kurita et al. ..................... 409/140 X |
| 5,312,212 | * | 5/1994 | Naumel ................................ 409/138 |

FOREIGN PATENT DOCUMENTS

| 3432773 | * | 1/1985 | (DE) ...................................... 409/138 |
| 90 16 465 | | 2/1991 | (DE) . |
| 4242874 | * | 11/1993 | (DE) ...................................... 409/138 |
| 44 10 762 | | 10/1995 | (DE) . |
| 297 10 727 | | 10/1997 | (DE) . |
| 0 845 440 | | 6/1998 | (EP) . |
| 2 510 029 | | 1/1983 | (FR) . |
| 6-179184 | * | 6/1994 | (JP) ...................................... 409/138 |
| 97 11 807 | | 4/1997 | (WO) . |

\* cited by examiner

*Primary Examiner*—William Briggs

(57) ABSTRACT

A tool unit is guided by a handling unit movable in several planes for cutting out recesses or bores and de-burring the work-pieces in one operational step. A de-burring cutter is mounted in a support arm for the tool which is movable about a central axis and is engaged by two spring arrangements disposed on opposing sides of the support arm and is returned to the original position following displacement. The springs of the spring arrangement can be replaced to adjust the spring pressure to various work materials and work-pieces. The cutting angle of the tool cutter is set automatically via the pressing force. Radial movement of the cutter is possible as are resilient deflection and precise return. A spring pressure pin arrangement is provided for balancing the cutter.

10 Claims, 5 Drawing Sheets

TOOL UNIT WITH CUTTER HEAD

BACKGROUND OF THE INVENTION

The invention concerns a tool unit which can be mounted to a handling unit, e.g. a robot, controlled NC shafts or the like, and which can be moved preferably in several planes to de-bur work-pieces made from plastic, rubber, aluminum, textiles (compositions), felt, wood, porcelain or other materials, with a tool guided along the contours of the work-piece, e.g. a de-burring cutter mounted, by means of a cutter support, to a support arm disposed for rotation about a central axis, and with an adjustable spring arrangement, disposed on each of the opposing sides of the support arm which can deflect the support arm in both directions through a predetermined angular or spring path to press onto the work-piece, and to return the tool unit and cutter head to its original position.

DE-GM 297 10 727.5 discloses a unit with a cutter head having a very limited pivoting range, wherein the cutter axis has a central bearing only, without end positioning or defined zero position, which does not permit radial movement of the cutter, and which cannot be adjusted to softer or harder materials so that only relatively large bores or recesses can be de-burred.

With plastic molded parts, the de-burring process usually has to be carried out directly after removal from the mold. However, the work-piece shrinks considerably within a relatively short cooling period, such that size changes due to shrinking have to be taken into consideration for de-burring and the cutter tool has to be positioned and guided in a correspondingly flexible fashion.

It is the purpose of the invention to further develop a tool unit cutter head of this type in such a fashion that it can be used in an increased plurality of applications with improved efficiency.

SUMMARY OF THE INVENTION

This is achieved in accordance with the invention in that
a) tensioned pressure springs are disposed on opposing sides of the support arm,
b) the cutter support is borne on the support arm by means of ball bearings,
c) a stop is disposed on the casing for centering the support arm in its zero position, and
d) a stop pin is pivotably secured to the cutter support and is acted upon symmetrically at both ends by limiting spring pins which allow limited rotary movement of the cutter support on the work-piece through an adjustment angle of the tool, and
e) the tool and work-piece can be adjusted relative to one another.

Further embodiments of the invention are the subject of the dependent claims.

A tool unit cutter head in accordance with the invention facilitates cutting out and de-burring of recesses, bores and the like on work-pieces of plastic, aluminum, wood, rubber, composite textiles, porcelain or similar materials, with one single tool unit or cutter tool and in one single operating step. Both large as well as small recesses and bores having diameters of only approximately 3 to 4 mm can be precisely cut out and de-burred. In accordance with the invention, the bearing of the tool facilitates automatic adjustment of the cutting angle via the pressing force, and radial movement or rotation of the cutter is possible through a small adjustment angle to automatically adjust an optimum cutting angle. The cutter is preferably provided with a cutting edge angled to achieve exact positioning.

The pressure springs on both sides of the support arm are preferably disposed to provide a relatively long spring path.

The springs can be replaced to change the response characteristics and to adjust the spring pressure to various conditions of use. The spherical or spherical segment shaped design of the bolt seating on one side of the support arm facilitates, in a particularly simple and useful manner, precise restoring force resilience and soft deflection of the tool to always allow perfect adaptation to the outer shape of the work-piece. This adjustment of the tool or cutter is enhanced by the spring pressure pins acting on the bolt disposed in the cutter support.

The use of a ball thrust member or a latching device between the casing and the support arm creates final or zero positioning of the tool or of the tool support by the adjustable spring pins. In principle and in addition or alternatively thereto, an induction sensor can be disposed on the casing, the support arm, or the cutter to monitor the deflection of the support arm.

Moreover, programming of the proposed tool unit is easier than with the conventional unit. The work-piece can move relative to the tool with the tool stationary, or the tool can move relative to the work-piece with the work-piece stationary. A movable work-piece can be easily guided past a stationary tool and, e.g. past additional tools e.g. a thread cutter or the like.

The invention is described in more detail in embodiments with reference to the drawing.

DESCRIPTION OF THE PREFERRED EMBODIMENT

Figure 1:
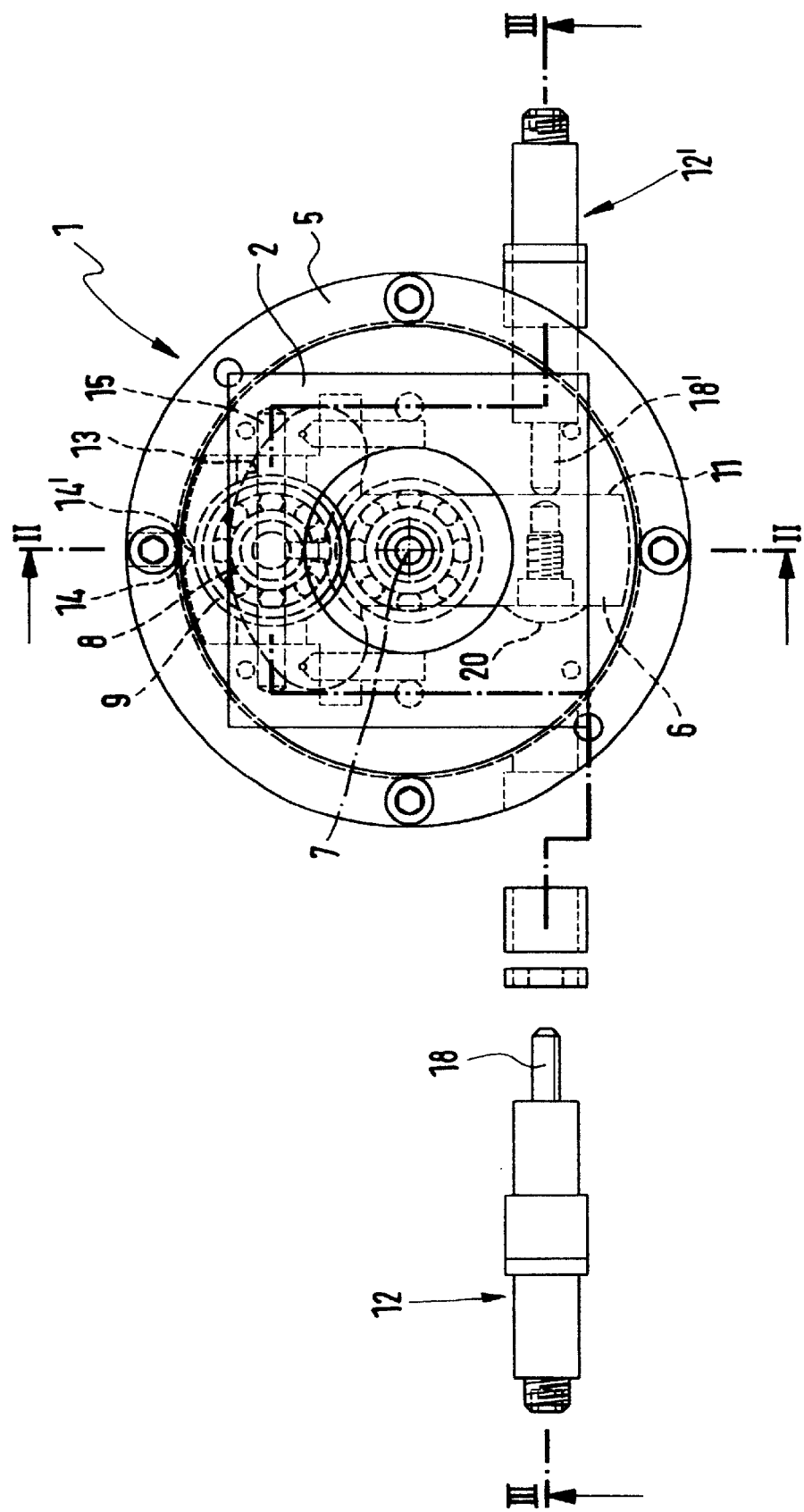
FIG. 1 shows a top view of a cutter tool head according to the invention.

A cylindrical casing 1 comprises an adapter flange 2 for accommodating a robot (not shown), an upper lid 3 accommodating the adapter flange, a cylindrical casing central part 4 and a lower lid 5. A pivoting or support arm 6 is centrally supported at 7 in the casing part 4. The support arm 6 comprises a head part 8 with a cutter support 9 for the cutter tool 10 and a shaft part 11 which is pre-tensioned, in a zero position, on both sides by spring pressure pieces 12, 12'. The cutter support 9 comprises a clamping device 9' e.g. a lock nut for fixing the cutter tool 10 and is guided in an elongated slot 13, provided in the upper lid 3 which curves about the center 7 in the form of a circular segment such that the support arm can be pivoted through a predetermined angle of approximately +/-40° relative to the zero position. The zero position of the support arm 6 is defined by an approach switch 14 or a mechanical stop device cooperating with a corresponding mating element 14' on the outer surface of the head part.

The head part 8 is mounted in the support arm 9 via a ball bearing and bears a bolt or stop pin 15 which can pivot relative to the longitudinal axis of the support arm and whose position is pre-tensioned by springs via the limiting spring pressure pins 16, 16', to thereby achieve cutter balance. The spring pressure pins 16, 16' constitute limiting and adjustment pins for the stop pin 15 and allow rotation of the support arm 9, and thereby of the tool clamping means and of the tool 10, about a small adjustment angle. The spring pressure pins 16, 16' can be adjusted to change the force exerted by the spring pressure pins on the stop pin 15 for adjusting the cutting angle of the tool. A pressure cylinder may be provided instead of such a spring pressure pin to effect exact automatic positioning.

The deflection of the support arm 9 is limited by the spring pressure pins 12, 12', 19. The pressure bolts 18, 18' of the spring pressure pins act in opposite directions on the opposing side surfaces of the support arm 6. A side surface is provided with a spherical or spherical segment shaped elevation in the form of a support 20 which guarantees precise restoring forces and resilient deflection of the tool.

Figure 2:
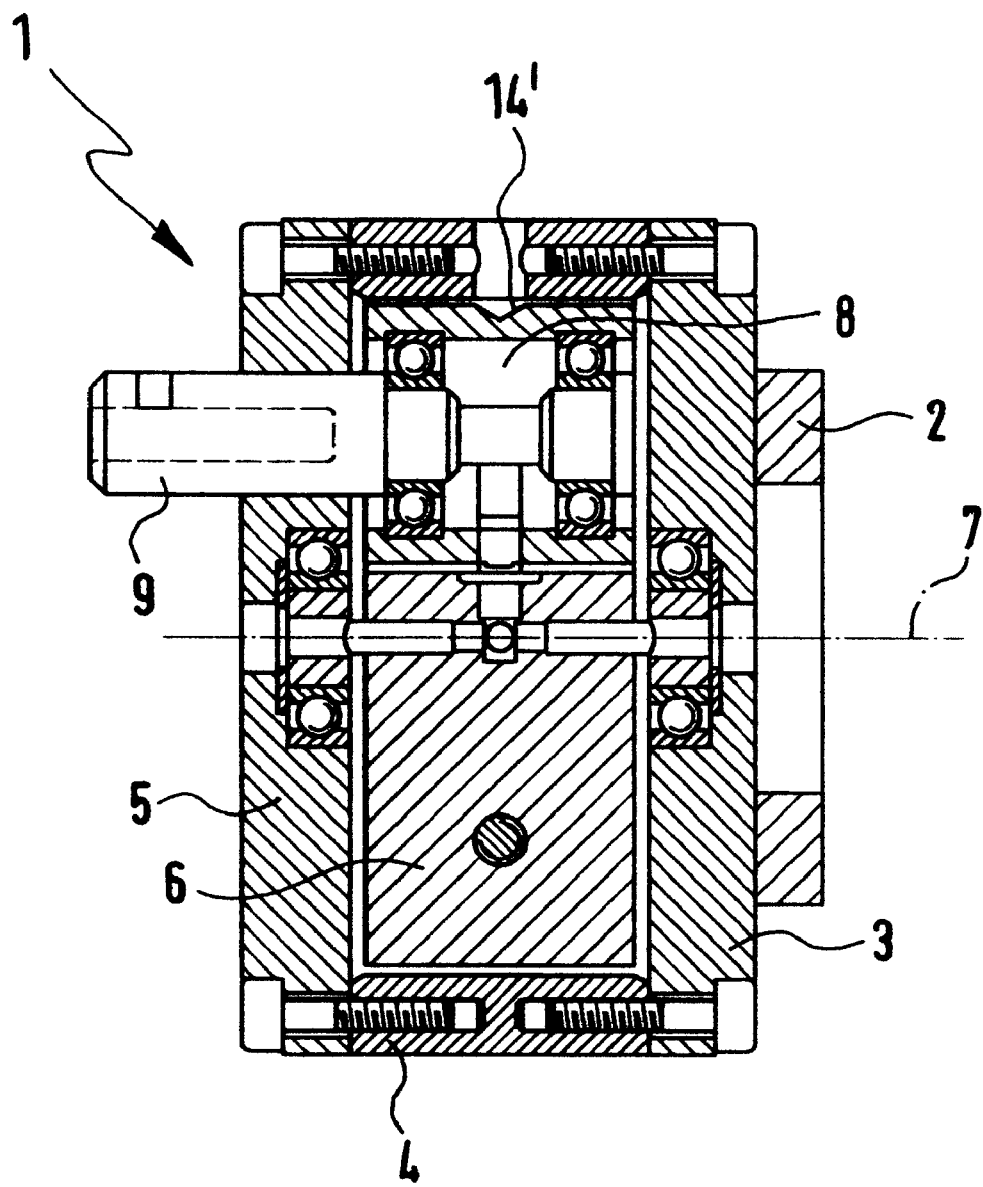
FIG. 2 shows a side sectional view along the line II—II of the cutter tool head according to FIG. 1.
Figure 3:
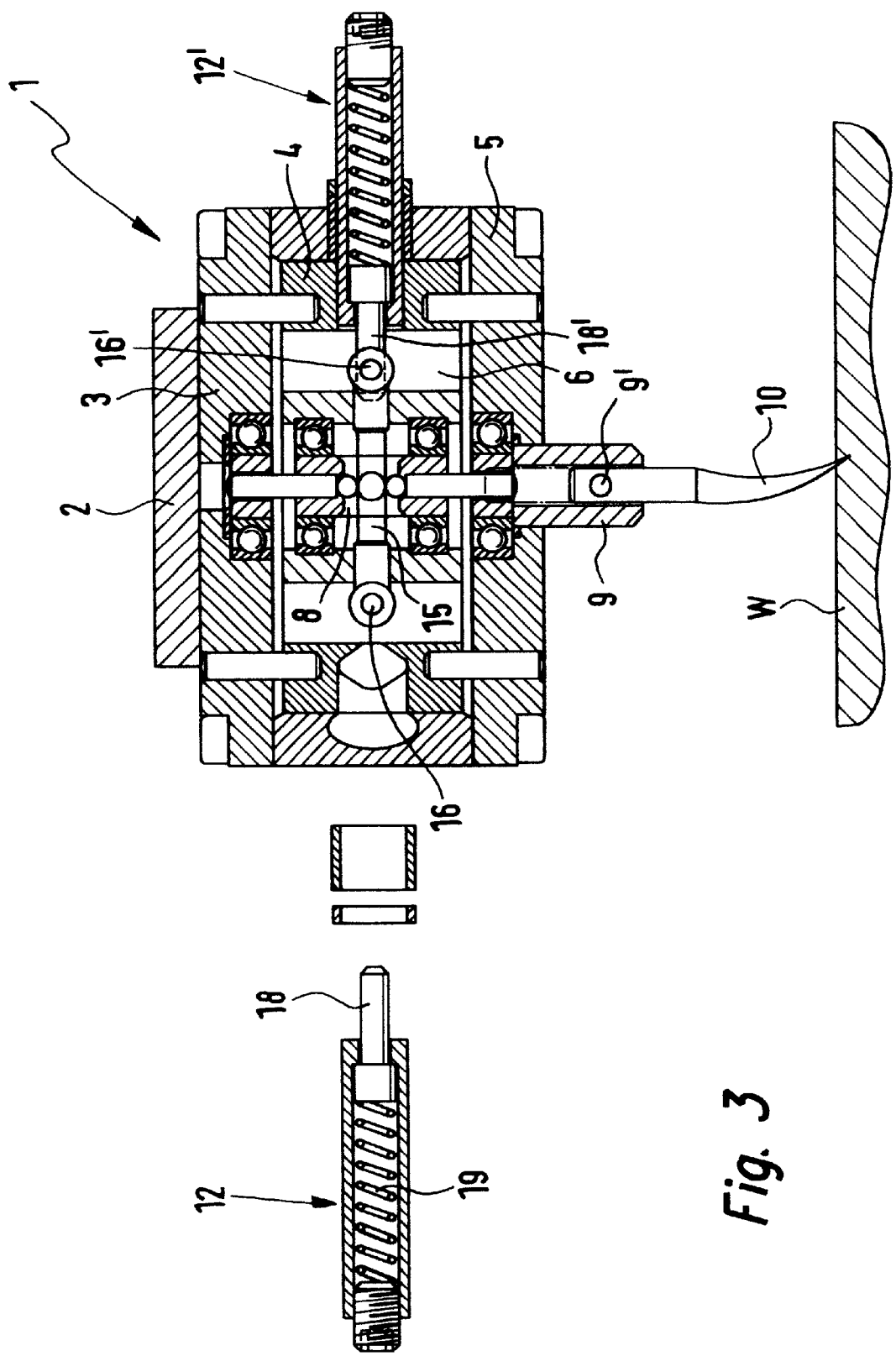
FIG. 3 shows a side sectional view along the line III—III of the cutter tool head according to FIG. 1.
Figure 6:
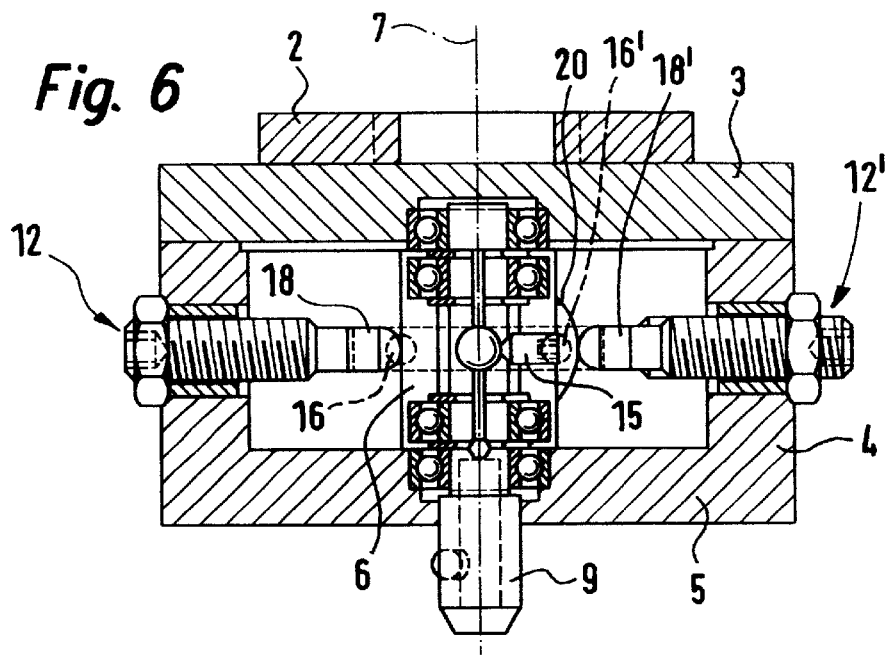
FIG. 6 shows a side sectional view along line VI—VI of the cutter tool head according to FIG. 4.
Figure 4:
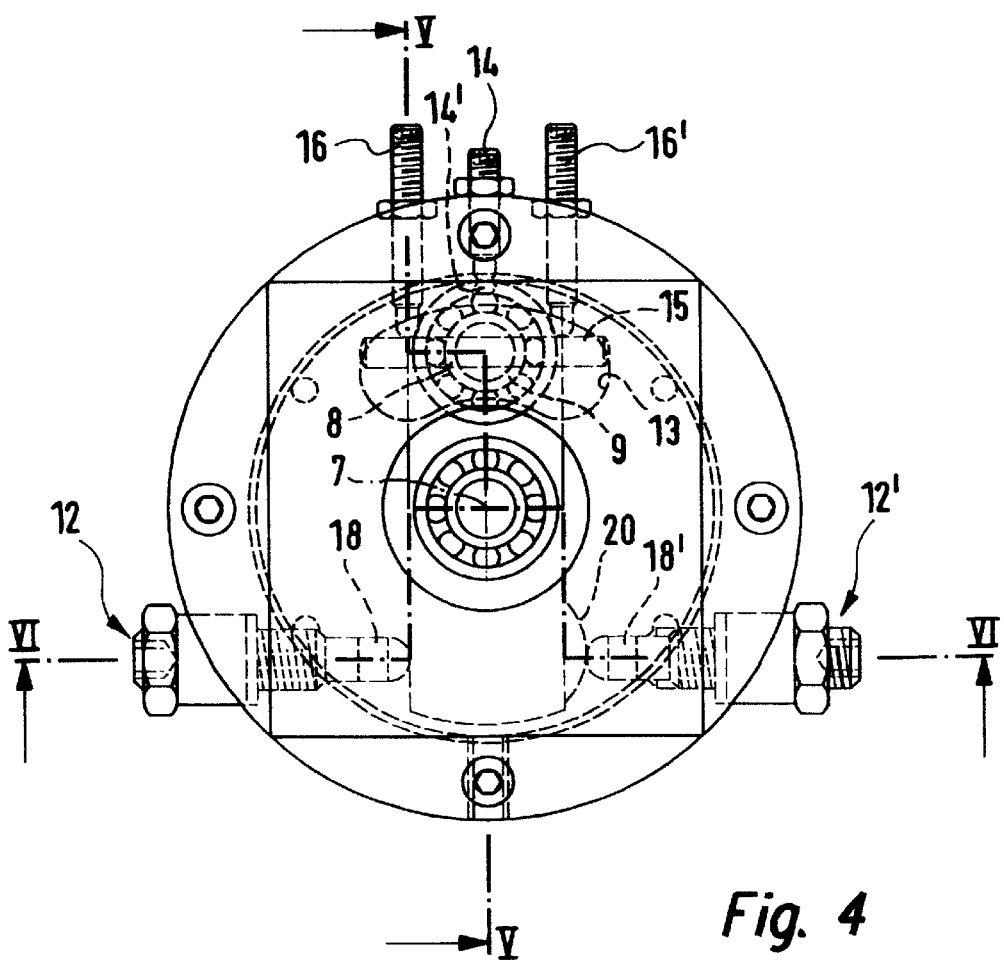
FIG. 4 shows a modified embodiment of a cutter tool head from the top.
Figure 5:
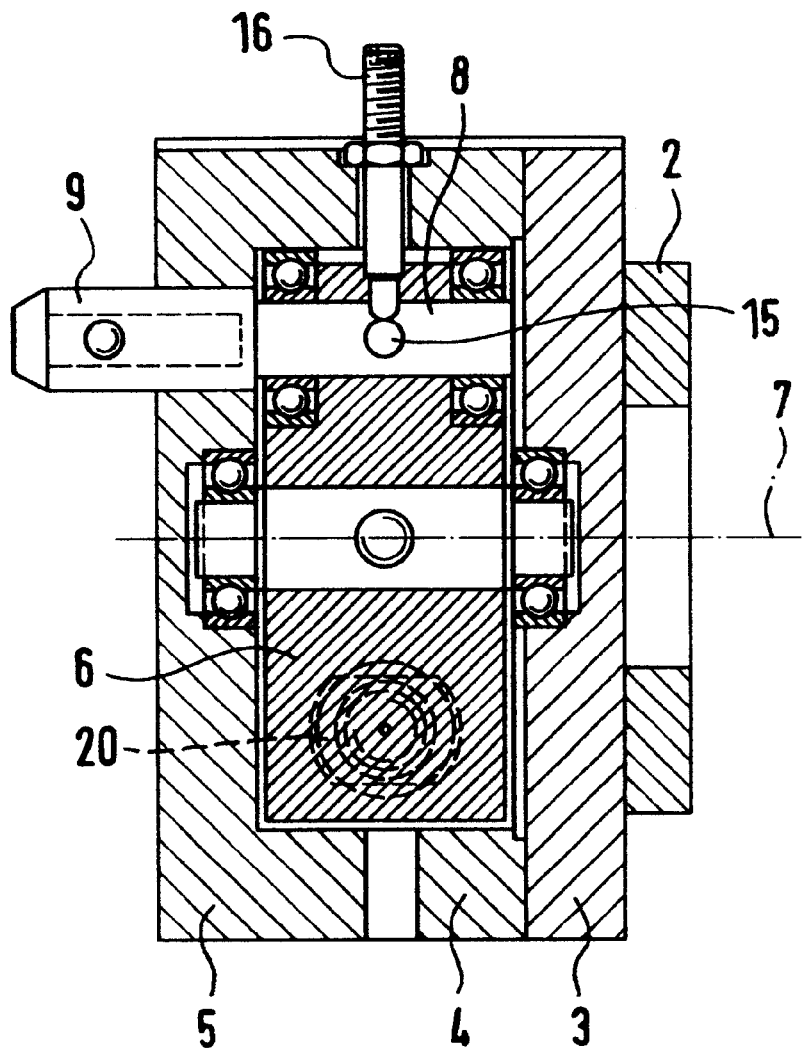
FIG. 5 shows a side sectional view along line V—V of the cutter tool head according to FIG. 4.

FIGS. 4, 5 and 6 show a further embodiment of a cutter tool head corresponding to the arrangement shown in FIGS. 1–3.

LIST OF REFERENCE NUMBERS 1 casing
2 adapter flange
3 lid
4 casing central part
5 lid
6 support arm
7 bearing
8 head part
9 cutter support
9' clamping device
10 cutter tool
11 shaft part
12, 12' spring pressure piece
13 elongated slot
14 approach switch or stop device
14' mating element
15 bolt/stop pin
16, 16' spring pressure pin
16a pressure cylinder
17, 17' flange
18, 18' pressure bolt
19 spring element
20 spherical support

I claim:

1. A tool unit for mounting to a handling unit, to a robot and to controlled NC shafts, the unit for de-burring work-pieces made from plastic, rubber, aluminum, textiles, felt, wood and porcelain, the unit comprising:

a housing;

a support arm mounted within said housing for rotation about a first axis, said support arm extending in a direction substantially transverse to said first axis;

a cutter support mounted in said support arm for rotation about a second axis separated from and substantially parallel to said first axis;

a stop pin mounted through said cutter support and extending in a direction substantially transverse to said second axis;

first pressure means disposed on said housing to cooperate with opposite sides of said support arm at a separation from said first axis, opposite said cutter support, for rotating said support arm about said first axis;

second pressure means disposed on said housing and symmetrically cooperating with opposite ends of said stop pin for rotating said cutter support within said support arm;

stop means disposed on said housing and cooperating with said support arm to center said support arm in a zero position; and cutter means mounted to an end of said cutter support outside said housing for de-burring the work-pieces.

2. The tool unit of claim 1, wherein said support arm comprises a spherical or spherical segment shaped elevation for engagement with said first pressure means.

3. The tool unit of claim 1, wherein said first pressure means comprise exchangeable, adjustable springs for pre-tensioning said pressure means against said support arm.

4. The tool unit of claim 1, wherein said first pressure means have a spring path substantially greater than a spring path of said second pressure means.

5. The tool unit of claim 1, wherein said first pressure means comprise screws for adjusting a spring force of said pressure means.

6. The tool unit of claim 1, wherein said stop means comprises one of a stop and a ball thrust member disposed between said casing and an outer face of said support arm facing said casing, for fixing a zero position of said support arm.

7. The tool unit of claim 1, further comprising means for monitoring a deflection of said support arm.

8. The tool unit of claim 1, wherein at least one of said first pressure means and said second pressure means comprise a pressure cylinder.

9. The tool unit of claim 1, wherein the work-piece is stationary and the tool unit is movable relative to the work-piece.

10. The tool unit of claim 1, wherein the tool is stationary and the work-piece is movable relative to the tool unit.

* * * * *